US010801857B2

(12) United States Patent
Okuda et al.

(10) Patent No.: US 10,801,857 B2
(45) Date of Patent: Oct. 13, 2020

(54) NAVIGATIONAL INFORMATION DISPLAY DEVICE, AND METHOD OF DISPLAYING NAVIGATIONAL INFORMATION

(71) Applicant: Furuno Electric Co., Ltd., Nishinomiya (JP)

(72) Inventors: Masato Okuda, Nishinomiya (JP); Takatoshi Morita, Nishinomiya (JP); Timo Kostiainen, Espoo (FI); Jussi Suistomaa, Espoo (FI); Petri Turkulainen, Espoo (FI)

(73) Assignee: Furuno Electric Co., Ltd., Nishinomiya (JP)

( * ) Notice: Subject to any disclaimer, the term of this patent is extended or adjusted under 35 U.S.C. 154(b) by 9 days.

(21) Appl. No.: 16/039,239

(22) Filed: Jul. 18, 2018

(65) Prior Publication Data

US 2019/0025069 A1 Jan. 24, 2019

(30) Foreign Application Priority Data

Jul. 19, 2017 (JP) .................................. 2017-139621

(51) Int. Cl.
*G01C 21/36* (2006.01)
*B63B 49/00* (2006.01)
(Continued)

(52) U.S. Cl.
CPC ............ *G01C 21/367* (2013.01); *B63B 49/00* (2013.01); *G01C 21/203* (2013.01);
(Continued)

(58) Field of Classification Search
CPC ................ G01C 21/367; G01C 21/203; G01C 21/3664; B63B 49/00; G06F 3/04845;
(Continued)

(56) References Cited

U.S. PATENT DOCUMENTS

2005/0052413 A1*   3/2005   Ueno .................. G01C 21/3673
                                                                345/158
2010/0106411 A1*   4/2010   Nirhamo ............ G01C 21/3679
                                                                701/533
2016/0153785 A1    6/2016   Steward et al.

FOREIGN PATENT DOCUMENTS

EP    3006323 A1    4/2016
JP    H086495 A     1/1996
(Continued)

OTHER PUBLICATIONS

European Patent Office, Extended European Search Report Issued in Application No. 18184025.7, dated Dec. 13, 2018, Germany, 9 pages.

*Primary Examiner* — Maceeh Anwari
(74) *Attorney, Agent, or Firm* — Alleman Hall Creasman & Tuttle LLP (57) ABSTRACT

A navigational information display device is provided, which may include a display configured to display a navigational image indicated using a geometrical figure related to first navigational information, and further display one or more characters selected from the group consisting of a first navigational information character indicative of the first information, a second navigational information character indicative of second navigational information, and a device operation character related to operation of the display device, and processing circuitry configured to receive input of an instruction signal to instruct a change in a display orientation of the screen, and to change a display orientation of at least one of the one or more characters while maintaining a display orientation of the navigational image when the input of the instruction signal is received.

12 Claims, 7 Drawing Sheets

(51) Int. Cl.
*G01C 21/20* (2006.01)
*G06F 3/0484* (2013.01)
*G09B 29/10* (2006.01)

(52) U.S. Cl.
CPC ..... *G01C 21/3664* (2013.01); *G06F 3/04845* (2013.01); *G09B 29/106* (2013.01)

(58) Field of Classification Search
CPC . G06F 3/0488; G06F 3/04847; G09B 29/106; G01S 19/46; G01S 13/89; G01S 13/86
USPC ........................................................ 701/454
See application file for complete search history.

(56) References Cited

FOREIGN PATENT DOCUMENTS

WO      2013051051 A1    4/2013
WO   WO2013051051   *  4/2013

* cited by examiner

NAVIGATIONAL INFORMATION DISPLAY DEVICE, AND METHOD OF DISPLAYING NAVIGATIONAL INFORMATION

CROSS-REFERENCE TO RELATED APPLICATION(S)

This application claims priority under 35 U.S.C. § 119 to Japanese Patent Application No. 2017-139621, which was filed on Jul. 19, 2017, the entire disclosure of which is hereby incorporated by reference.

TECHNICAL FIELD

The present disclosure primarily relates to a navigational information display device which displays navigational information.

BACKGROUND

Conventionally, display devices which display navigational information have been known. WO2013/051051A1 discloses this kind of display device.

In WO2013/051051A1, a display device which displays a nautical chart, a radar image, an underwater detection image, etc. is disclosed. Note that, a speed, position, navigational route, etc. of a ship are further displayed on this display device.

Generally, in the display device which displays the navigational information, the display orientation of the screen is fixed and, thus, a change in the screen display orientation is not considered. Therefore, WO2013/051051A1 does not disclose the change in the screen display orientation, either.

SUMMARY

The present disclosure is made in view of the above situation, and one purpose thereof is to provide a navigational information display device, which allows user(s) to smoothly grasp navigational information even when a display orientation of a screen is changed.

According to one aspect of the present disclosure, a navigational information display device is provided. That is, this navigational information display device may include a display and processing circuitry. The display may display a navigational image indicated using a geometrical figure related to first navigational information, and further display one or more selected from the group consisting of a first navigational information character indicative of the first navigational information, a second navigational information character indicative of second navigational information of which a display position is determined based on a spatial relationship defined in screen space of a screen displayed on the display, and a device operation character related to operation of the display device. The processing circuitry may be configured to receive input of an instruction signal to instruct a change in a display orientation of the screen. The processing circuitry may change a display orientation of at least one of the one or more characters while maintaining a display orientation of the navigational image, when the input of the instruction signal is received.

Thus, since the display orientation of the characters may be changed according to the change in the display orientation of the screen, a user may be able to easily check the characters displayed on the display. On the other hand, since the display orientation of the navigational image may be maintained, the user does not need to mentally rearrange the correspondence between the geographical position (actual position) and the position on the screen. By the above configuration, the navigational image may be grasped smoothly even when the display orientation of the screen is changed.

BRIEF DESCRIPTION OF DRAWINGS

The present disclosure is illustrated by way of example and not by way of limitation in the figures of the accompanying drawings, in which like reference numerals indicate like elements and in which.

DETAILED DESCRIPTION

Figure 1:
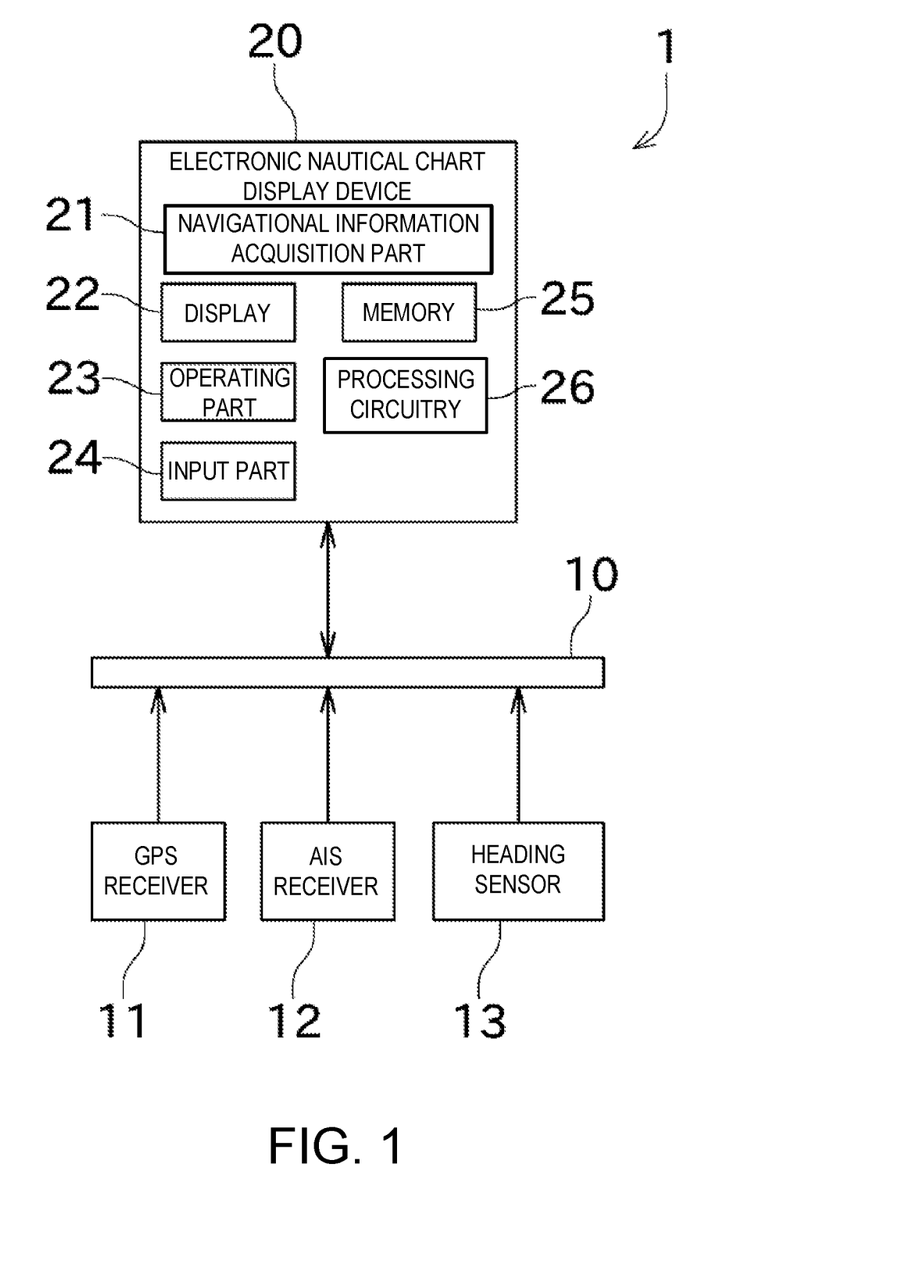
FIG. 1 is a block diagram of an electronic nautical chart display network system including an electronic nautical chart display device according to a first embodiment of the present disclosure.

Next, several embodiments of the present disclosure will be described with reference to the accompanying drawings. First, referring to FIG. 1, an electronic nautical chart display network system 1 (hereinafter, simply referred to as "the network system 1") is described. FIG. 1 is a block diagram of the network system 1 including an electronic nautical chart display device 20 (hereinafter, simply referred to as "the display device 20") according to a first embodiment of the present disclosure.

The network system 1 may be mounted on a ship provided with the system 1 (hereinafter, may be referred to as "the ship" in order to distinguish from other ships) and displays various kinds of information necessary for navigation. As illustrated in FIG. 1, the network system 1 may be comprised of a GPS receiver 11, an AIS receiver 12, a heading sensor 13, and the electronic nautical chart display device 20 (a navigational information display device). Ship instruments which constitute the network system 1 may be connected with each other through a ship network 10.

The ship network 10 may be a network where the ship instruments mounted on the same ship communicate mutually. One ship instrument may be capable of transmitting and receiving detected information etc. to/from another ship instrument through the ship network 10. The ship network 10 may be a LAN (Local Area Network), and may particularly be one of or any combination of Ethernet (IEEE 802.3) equipment, CAN (Controller Area Network) equipment, and NMEA2K (National Marine Electronics Association 2000)

(IEC 61162-3) communications standard compatible equipment. Note that at least one of the GPS receiver 11, the AIS receiver 12, and the heading sensor 13 may directly be connected with the display device 20 via cables etc., without the ship network 10.

The GPS receiver 11 typically receives positioning signals from GPS Satellites through a GPS antenna (not illustrated). The GPS receiver 11 may calculate the position of the ship (in detail, the position of the GPS antenna or the terrestrial-reference-based absolute position) based on the positioning signals and transmit it to the display device 20. Note that the GPS receiver 11 may calculate the position of the ship by using other GNSS technologies (e.g., GLONASS, GALILEO, etc.).

The AIS receiver 12 may be configured to receive an AIS signal transmitted from another ship. The AIS (Universal Shipborne Automatic Identification System) is a system which wirelessly transmits positional information, cruise information, etc., on the ship to peripheral ships and/or communication devices. The AIS receiver 12 may receive the AIS signal transmitted from another ship and analyze it to acquire information, such as the absolute position, the destination, etc. of another ship (AIS information). The AIS receiver 12 may transmit the acquired AIS information to the display device 20. The AIS information may include the name, the absolute position, the course, the destination, etc., of another ship. Note that an analysis of the AIS signal may be performed at the display device 20 end.

The heading sensor 13 may be configured to detect the heading of the ship (a direction of the ship's bow) in the absolute azimuth in the terrestrial reference system. The heading sensor 13 may be one of or any combination of a magnetic direction sensor, a GPS compass, and a gyrocompass. The heading sensor 13 may transmit the detected heading to the display device 20.

The display device 20 may be a device for displaying electronic nautical chart(s). In this embodiment, the display device 20 is of a comparatively large-size (e.g., its screen size is 30 inches or 40 inches or larger) so that multiple users are able to check the contents simultaneously. In addition, the display device 20 may be arranged horizontally, i.e., its display screen is substantially parallel to a horizontal plane so that the multiple users are able to check the displayed contents while surrounding the display device 20. In this case, when the user's viewing direction of the screen differs from the display orientation of characters displayed in the electronic nautical chart, depending on the user's position, the user may have a difficult time to read the characters displayed on the display device 20.

The term "horizontal(ly)" or "horizontal direction" as used herein may refer to a surface parallel to the floor surface where the display device 20 is installed, as well as a surface perpendicular to the vertical direction. Further, the term "substantially horizontal(ly)" or "substantially horizontal direction" as used herein may be within a predetermined angle such as 10 degrees or less with respect to an exactly horizontal surface, thus it will be appreciated is not necessarily a surface which is exactly perpendicular to the vertical direction or parallel to the floor surface. Moreover, if the angle of the screen of the display device 20 is changeable, changing the angle to the horizontal direction may correspond to "arranging the screen of the display device 20 parallel to the horizontal direction."

As illustrated in FIG. 1, the display device 20 may include a navigational information acquisition part 21 (hereinafter, may be simply referred to as "the acquisition part 21"), a display part 22 (e.g., a display), an operating part 23, an input part 24, a memory part 25, and an arithmetic logical unit 26 (e.g., processing circuitry).

The acquisition part 21 may acquire the navigational information from at least one of the instruments exterior of the display device 20 (in this embodiment, the GPS receiver 11, the AIS receiver 12, and the heading sensor 13), and at least one of internal instruments (in this embodiment, the memory part 25). In this embodiment, the acquisition part 21 may be an instrument or component for receiving information, and may be wiredly or wirelessly connected to the internal and/or external instrument(s) of the display device 20. Moreover, the term "navigational information" as used herein may refer to information related to navigation, such as information to be used during navigation, detection value(s) used in order to calculate the information to be used during navigation, and information acquired during navigation. Further, the acquisition part 21 may particularly acquire first navigational information and second navigational information as the navigational information. The term "first navigational information" as used herein may refer to navigational information associated with a geographical position (e.g., information indicative at the position of the sea, land, another ship, buoy, etc.). The first navigational information may be mainly displayed in an area indicative of a given geographical range, and a display position thereof is determined according to the position at which each navigational information is shown. The term "second navigational information" as used herein may refer to navigational information of which a display position is determined based on a spatial relationship defined in screen space of a screen displayed on the display. Screen space may for example be a coordinate system of the screen defining a logical origin, top, bottom, left and right side, as displayed. It will be appreciated that screen space rotates relative to the display part 22 when the orientation of the displayed screen is rotated. The second navigational information may be mainly information which is not associated with the geographical position. Note that, when the second navigational information is not displayed, the acquisition part 21 may be configured so that it does not acquire the second navigational information. The acquisition part 21 may output the acquired navigational information to the arithmetic logical unit 26.

The display part 22 may be a part having a screen which can display electronic data by figure(s), character(s), etc. Although the display part 22 is, for example, a liquid crystal display, it may be a plasma display or an organic electroluminescence display. In this embodiment, although the screen of the display part 22 may be of a rectangular shape, it may also be of a different shape (e.g., square or other polygons).

The operating part 23 may be a touch panel of a capacitance type, which may be arranged on the screen of the display part 22. The operating part 23 may be detectable of the user or a given operation implement touched the screen. Note that, alternatively or additionally to the touch panel, hardware key(s) may be provided. In this embodiment, the display device 20 may be configured so that the electronic nautical chart display device 20 itself is provided with the operating part 23. Alternatively, other operating parts, such as a mouse and a keyboard, may be connected to the display device 20, and this display device 20 may be configured to be receivable of instructions from these operating parts. The operating part 23 may output an electrical signal according to operation performed by the user. In particular, a signal outputted by performing an operation to change in the display orientation of the screen of the display part 22 may be referred herein to as "the instruction signal." Note that the "display orientation of the screen" may mean that, for example, the direction of the screen (entire screen) being displayed with respect to the orientation of the display part 22 (i.e., the upper side of the screen is oriented to the upward, downward, rightward, or leftward of the display part 22). Thus, the display part 22 is a physical part including addressable light emitting elements as described herein, and the screen is a logical concept of an output image that is mapped to those addressable light emitting elements according to the display orientation of the screen relative to the display part 22.

The signals (instruction signal etc.) outputted from the operating part 23 may be inputted into the input part 24. Alternatively or additionally to the signal outputted from the operating part 23, a signal outputted from the instrument which is external to the display device 20 may be inputted into the input part 24. In particular, the input part 24 may be an input port etc., to which the signal outputted from the operating part 23, and the signal outputted from which the external instrument are inputted. The arithmetic logical unit 26 may process according to the signal inputted into the input part 24.

The memory part 25 may store nautical chart information (particularly, a vector nautical chart), point(s) registered by the user, route(s) created by the user, various programs, etc. The memory part 25 may be a nonvolatile memory, such as a hard disk drive, a flash memory (a flash disk, a memory card, etc.), or an optical disc. The memory part 25 may be comprised of one or more of the hardware described above. For example, only the nautical chart information may be stored in the optical disc and other information may be stored in the hardware.

The arithmetic logical unit 26 may be an arithmetic processor, such as a FPGA, ASIC, or CPU. The arithmetic logical unit may be configured to execute various processing tasks related to the display device 20 by reading the program(s) stored in the memory part 25 to the RAM 27, etc., and executing the program(s). For example, the arithmetic logical unit 26 performs processing for displaying the nautical chart information stored in the memory part 25 on the display part 22 according to the signal inputted into the input part 24, processing for displaying variety of information received from the GPS receiver 11, the AIS receiver 12, and the heading sensor 13 on the display part 22, and processing for changing the display orientation of the screen of the display part 22, etc.

Next, referring to FIGS. 2 to 5, the information displayed on the display part 22 and the processing for changing the display orientation of the screen are described.

Figure 3:
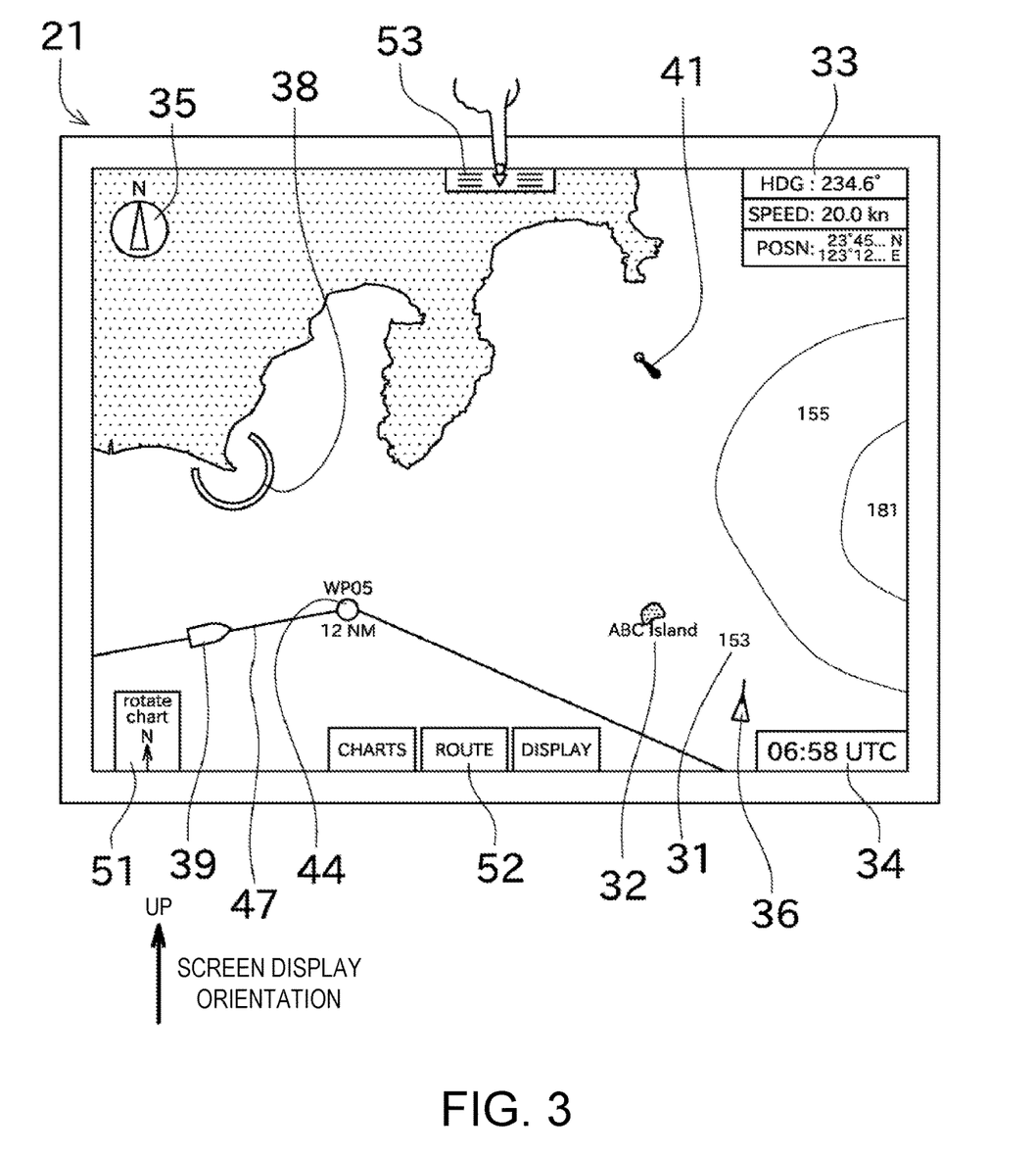
FIG. 3 is a view illustrating a screen which is displayed on a display part before changing the screen display orientation.

FIG. 3 illustrates a screen displayed on the display part 22 before the screen display orientation is changed. Note that the nautical chart information may include the positions of land(s), sea(s), etc., and the depth contours, the water depths, the names of locations, etc. The nautical chart information may correspond to the first navigational information described above. Further, the land(s), sea(s), depth contours, etc., may be displayed on the display part 22 by using geometrical figures, etc., at positions on the screen corresponding to geographical positions (actual position) of the land(s), sea(s), and water depths. For example, the land part may be displayed by dots, the sea part may be displayed by a plain area, and the depth contour may be displayed by a line. Thus, in the first embodiment, the land(s), sea(s), depth contours, etc. may be displayed as "navigational images." The navigational image may be an image which graphically displays the first navigational information in an area indicative of a given geographical range according to the corresponding geographical position.

As illustrated in FIG. 3, in the display part 22, as items displayed corresponding to the navigational information other than the navigational images, a water depth 31, a name of location 32, ship's basic information 33, a time 34, an azimuth symbol 35, an AIS symbol 36, an illuminating range symbol 38, a ship symbol 39, a buoy symbol 41, a waypoint 44, and a navigational route line 47 are displayed, for example.

The water depth 31 may be character(s) or number indicative of the water depth at the position where the character(s) or number is displayed. The name of location 32 may be character(s) indicative of the name of location at the position where the character(s) is displayed. Therefore, the water depth 31 and the name of location 32 may be the navigational information associated with the geographical position. Here, the water depth 31 or the name of location 32 may correspond to the "first navigational information character(s)" that is character(s) indicative of the first navigational information. Therefore, the water depth 31 or the name of location 32 may be displayed at the position on the screen corresponding to the geographical position.

The ship's basic information 33 may be fundamental information related to the ship, and specifically, it may be comprised of the heading, speed, position, etc. of the ship. The heading may be information which the display device 20 acquired from the heading sensor 13. The position may be information which the display device 20 acquired from the GPS receiver 11. The speed may be information which the display device 20 calculated based on a change in the position with time. The ship's basic information 33 may be displayed by characters or numbers. Note that the speed may be acquired from a ship's speedometer. The time 34 may be character(s) or number(s) indicative of the present time point. Here, the ship's basic information 33 or the time 34 may correspond to "second navigational information character" that is character(s) indicative of the second navigational information. Therefore, the display position of the ship's basic information 33 or the time 34 may be determined according to the spatial relationship with the screen. In this embodiment, similar to other common ship instruments, the display device 20 may display the ship's basic information 33 at the upper right corner of the screen, and display the time 34 at the lower right corner of the screen.

The azimuth symbol 35 may be a symbol indicative of the azimuth of the nautical chart currently displayed. The AIS symbol 36 may be a symbol created based on the AIS information acquired from the AIS receiver 12, or may be a symbol indicative of the position and course of another ship. The illuminating range symbol 38 may be a symbol indicative of a (directional) range which a lighthouse, etc., illuminates. The ship symbol 39 may be a symbol indicative of the position and heading of the ship. The azimuth symbol 35, AIS symbol 36, illuminating range symbol 38, and the ship symbol 39 may be symbols indicative of the navigational information, or may be symbols of which the display orientations change according to the azimuth indicated by the navigational information. Here, any one of the azimuth symbol 35, AIS symbol 36, illuminating range symbol 38, and the ship symbol 39 may correspond to a "first symbol." Depending on the circumstances, the "first symbol" may be a symbol indicative of the first navigational information or the second navigational information, and the display orientation of the first symbol may change according to the azimuth.

Note that, among the "first symbols," only the azimuth symbol 35 may be a symbol indicative of the second navigational information, and its display position may be determined not by the spatial relationship with the navigational information, but by the spatial relationship defined in screen space of the screen displayed on the display (e.g., the upper left corner of the screen). On the other hand, any of the other symbols of the "first symbols" other than the azimuth symbol 35 may be a symbol indicative of the first navigational information, which may be navigational information associated with the geographical position and may be displayed at the position on the screen corresponding to the geographical position.

The buoy symbol 41 may be a symbol indicative of the position of the buoy. Since the buoy symbol 41 is of a shape defined by a standard, etc., its display orientation is defined. Therefore, the buoy symbol 41 may be a symbol indicative of the navigational information, and may be a symbol of which the display orientation is determined. Here, the buoy symbol 41 may correspond to a "second symbol." The buoy symbol 41 may be a symbol indicative of the first navigational information or the second navigational information, and may be a symbol of which the display orientation is determined. Moreover, the buoy symbol 41 may also be a symbol indicative of the first navigational information associated with the geographical position, and may be displayed at the position on the screen corresponding to the geographical position.

The waypoint 44 may be a symbol indicative of the position registered by the user, added with character(s). The waypoint 44 may be comprised of a circular symbol indicative of the position, a name displayed by character(s) on the upper side of the symbol, and a distance to the waypoint 44 displayed on the lower side of the symbol. Although the waypoint 44 may indicate the position, it does not necessarily indicate an azimuth or direction.

The navigational route line 47 may be a line indicative of a navigational route. Therefore, the navigational route line 47 may not be character(s) but a geometrical figure. The navigational route may be a route created by the user setting a place of departure, transit locations, and a destination. Note that the user may also be able to set only the place of departure and the destination to cause the display device 20 to create the navigational route.

As illustrated in FIG. 3, on the display part 22, as items displayed corresponding to the device operation (user's operations of the display device 20), a nautical chart direction change button 51, menu buttons 52, and a screen direction change button 53 are displayed. The device operation buttons may include device operation characters indicative of the contents of the device operations. Note that an item which is currently displayed on the screen and is operable by user's touch operation(s) may be referred to as the device operation button (i.e., a button on a graphical user interface [GUI]).

The nautical chart direction change button 51 may be displayed on the lower left corner of the screen. The nautical chart direction change button 51 may be a device operation button for switching between a plurality of modes, such as "North-up" in which the nautical chart is displayed with the upper side of the screen being North, "Heading-up" in which the nautical chart is displayed with the upper side of the screen being the heading of the ship, and "Course-up" in which the nautical chart is displayed with the upper side of the screen being the direction of the course of the navigational route.

The menu buttons 52 may be displayed at the bottom and the center of the screen. The menu buttons 52 may each be a device operation button for performing an operation related to the nautical chart (e.g., maintenance of the nautical chart, creation of the route, or adjustment of the display).

The screen direction change button 53 may be displayed at the top and the center of the screen (along one of the long sides). The screen direction change button 53 may be a device operation button for changing the display orientation of the screen by 180 degrees. The screen direction change button 53 may be configured to complete an operation (instruction) by being touched by the user, or may be configured to complete the operation (instruction) by being dragged by the user in a given direction, for example.

The display items related to the navigational information and the device operation which are described above are examples, and the display device 20 may be capable of displaying other display items, or may be configured not to display some of the display items described above. Moreover, the shapes, etc., of the display items described above may be examples, and may have different shapes. Moreover, the display items of which the display positions are determined depending on the spatial relationship in screen space may be displayed at different positions from the positions described above.

Figure 2:
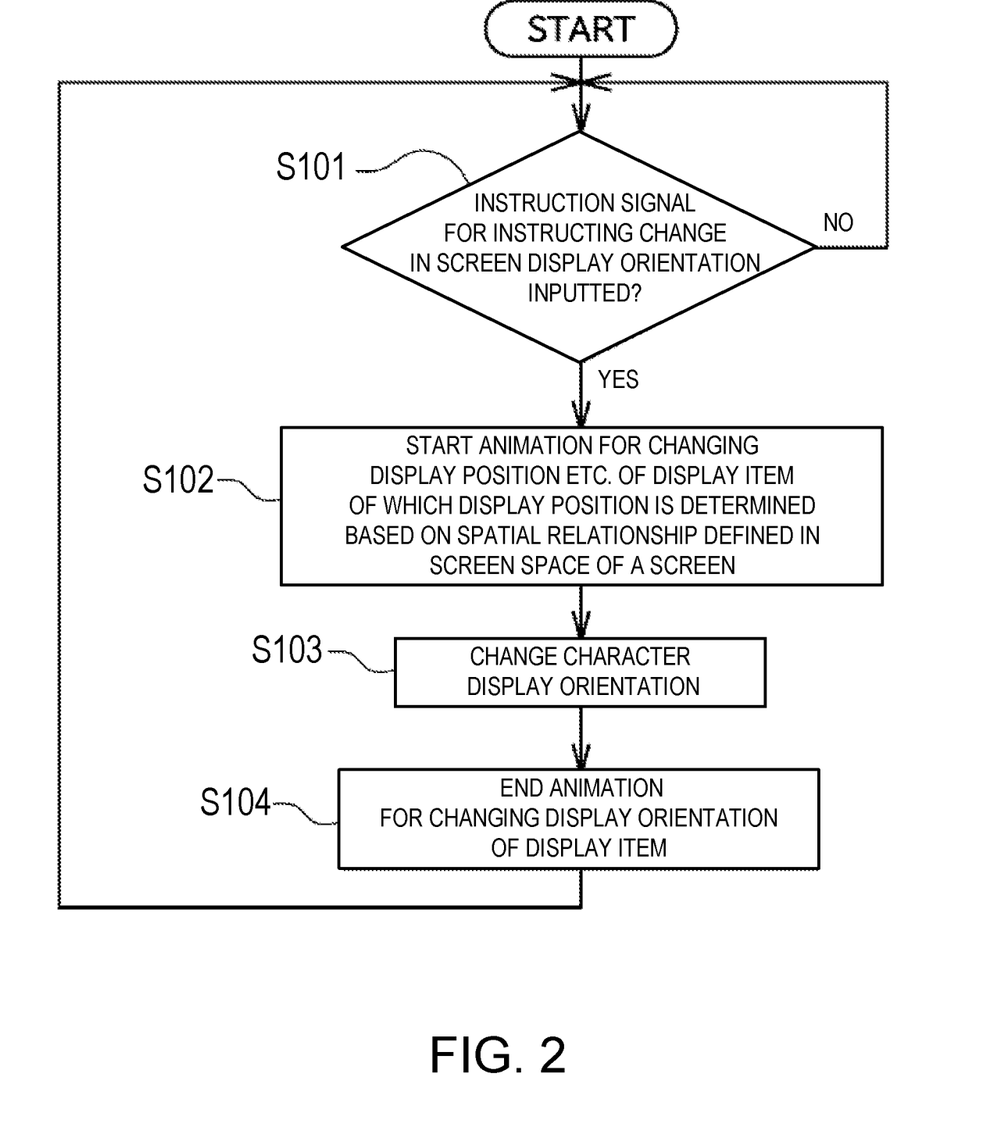
FIG. 2 is a flowchart illustrating processing which is performed by an arithmetic logical unit when rotating a display orientation of the screen.

Below, processing performed by the arithmetic logical unit 26 when the screen direction change button 53 is operated, and how the display of the display part 22 is changed, will be described. FIG. 2 illustrates a flowchart illustrating processing performed when the arithmetic logical unit 26 rotates the display orientation of the screen.

The arithmetic logical unit 26 determines whether the instruction signal for instructing the change in the display orientation of the screen (hereinafter, referred to as the "instruction signal") is inputted (S101). In this embodiment, the instruction signal is inputted into the input part 24 by the user operating the screen direction change button 53.

Note that the instruction signal may be inputted into the input part 24 based on an operation other than the operation of the screen direction change button 53. For example, other operations may include an operation of a hardware key, an instruction with user's voice, a detection result of user's position, etc. Moreover, the instruction signal may not require whether the instruction for changing the direction of the screen is described in this signal as data, but it may be sufficient if the direction of the screen is changed by inputting the instruction signal into the input part 24 as a trigger.

If the instruction signal is inputted (Yes at S101), the arithmetic logical unit 26 may start an animation for changing the display position, etc., of the display item of which the display position is determined based on the spatial relationship in screen space (S102). In this embodiment, "the display item of which the display position is determined based on the spatial relationship in screen space" may include "the second navigational information characters"="the ship's basic information 33 and the time 34," "the device operation button"="the nautical chart direction change button 51, the menu buttons 52, and the screen direction change button 53," and "the symbol indicative of the second navigational information"="azimuth symbol 35."

Figure 4:
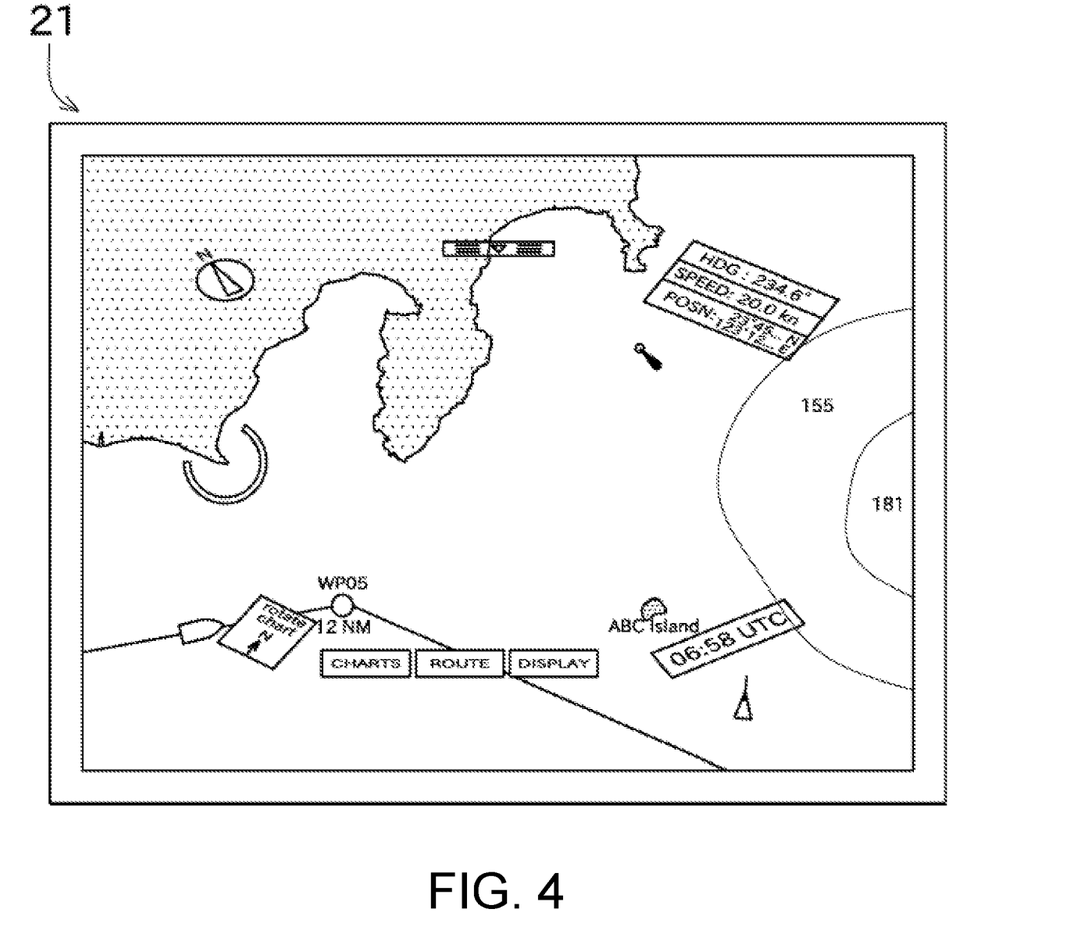
FIG. 4 is a view illustrating a screen which is displayed on the display part while changing the screen display orientation.

The animation described at Step S102 may be such that "the display item of which the display position is determined based on the spatial relationship with the screen" moves to a target position. Moreover, in this embodiment, since the display orientation of the screen may be changed by 180 degrees by operating the screen direction change button 53, each display item moves passing through the center of the screen, as illustrated in FIG. 4. In addition, in this embodiment, when the screen direction change button 53 passes through the center of the screen, animation is shown in which the front side and the back side of each display item is turned. By showing such animation, the fact that the display orientation of the screen is changed may become visually recognizable by the users. Note that such animation may be omitted.

Moreover, after this animation begins (after Step S102) and before it ends (before Step S104), the arithmetic logical unit 26 may change the display orientation of the characters (e.g., the first navigational information characters, the second navigational information characters) (S103). In this embodiment, the display orientation of the characters may be changed (rotated by 180 degrees) at a timing of "the display item of which the display position is determined based on the spatial relationship in screen space" passing through the center of the screen. Note that it may be configured so that the display orientation of the characters is changed at a different timing from this embodiment.

Below, how the display position and the display orientation of each display item are changed before and after the change in the screen display orientation will be described. In this embodiment, the arithmetic logical unit 26 may create an image to be displayed on the display part 22 by superimposing a plurality of layer images. Thus, an image in which only some of the display items may be rotated can be displayed on the display part 22 by rotating the direction of at least some of the display items which constitute each layer image.

Figure 5:
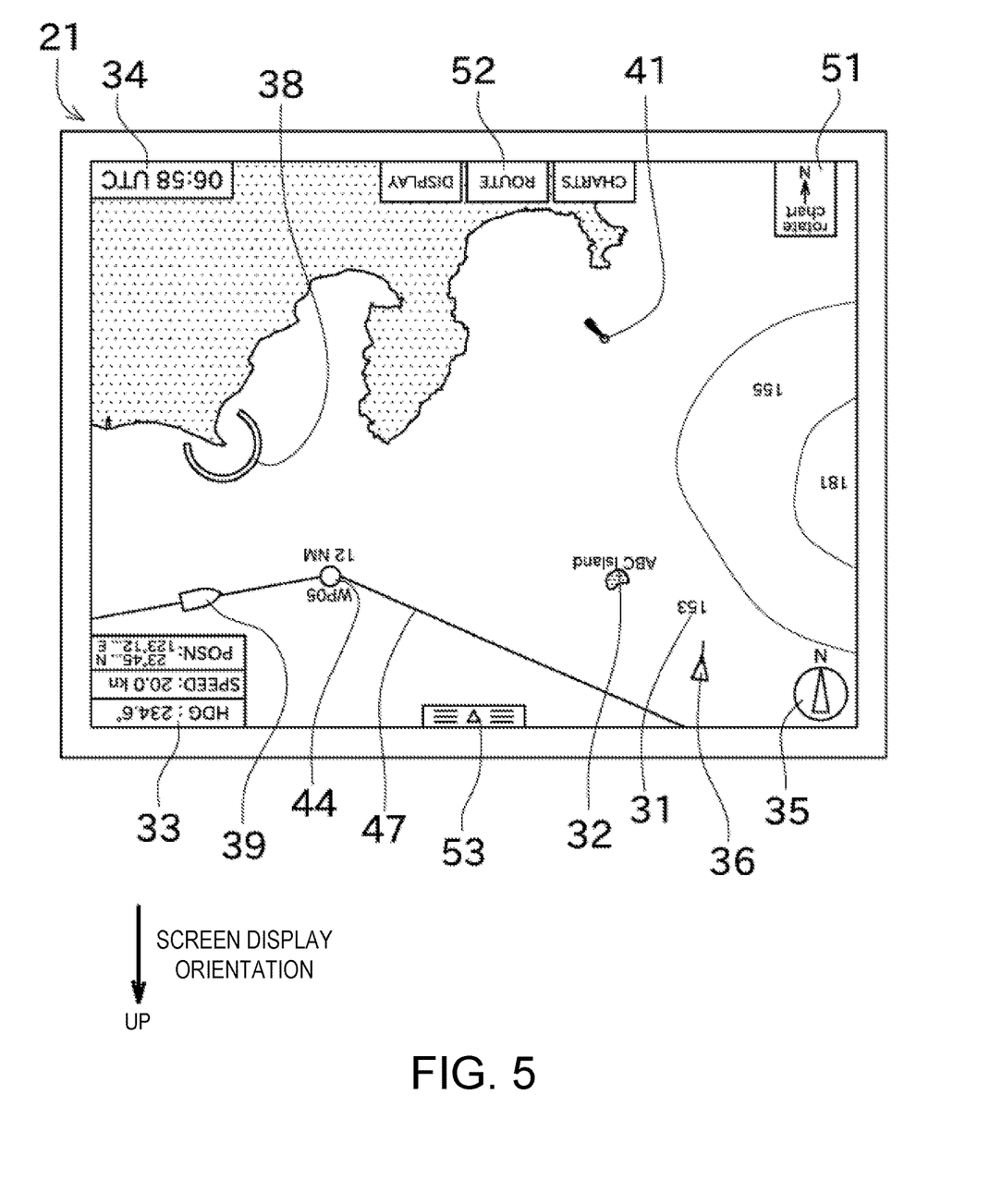
FIG. 5 is a view illustrating a screen which is displayed on the display part after the screen display orientation is changed.

In this embodiment, even when the display orientation of the screen is changed, the correspondence relation between the geographical position and the position on the screen may be maintained (not changed). In other words, the azimuth on the screen may not be changed before and after the change in the screen display orientation. Therefore, as illustrated in FIGS. 3 and 5, the direction of the nautical chart may not be changed even when the display orientation of the screen is changed. According to this configuration, for example, when one user is located along one of the long sides of the rectangular display part 22 and another user is located along the other long side, both of the users may be able to grasp the navigational information smoothly even when the display orientation of the screen is changed by 180 degrees, since they do not have to mentally rearrange the correspondence between the geographical position and the position on the screen. Note that since the display orientation of the nautical chart is maintained, the display position of the navigational route line 47 may be naturally maintained as well.

Since the first navigational information characters indicative of the water depth 31 or the name of location 32 may indicate the navigational information associated with the geographical position, the display position is maintained. Meanwhile, since the first navigational information characters are characters, the display orientation may be changed so that they become readable. Note that the name of location 32 may indicate an associated position (e.g., the position of an island), although the display position of the name of the location 32 and the display position of the graphical element corresponding to the location may not strictly be the same, for example, because the name of the location may be offset from the graphical element of the location by a distance in screen space, such as a legend displayed below the island in screen space. Nonetheless, in this situation, the offset name of the location stays in its positional relationship relative to the location itself, and thus such an offset location may correspond to the above-described item of which "the display position is maintained."

Since the display position of the second navigational information characters indicative of the ship's basic information 33 or the time 34 may be determined based on the spatial relationship in screen space, the display position may be changed (e.g., the characters may be rotated by an angle according to the change in the display orientation of the screen centering on the center of the screen). Thus, the user who operated the screen direction change button 53 may be able to check the ship's basic information 33 and the time 34 without feeling awkward (with a normal feel). On the other hand, since the second navigational information characters may be characters, the display orientation may be changed so as to be readable.

Thus, even if the displayed items are characters, the navigational information may be correctly displayed and the navigational information may be displayed without the users feeling awkward by determining whether the display position is to be maintained or changed as described above.

Since the display orientation of the first symbol indicative of any one of the azimuth symbol 35, AIS symbol 36, illuminating range symbol 38, and the ship symbol 39 may change according to the azimuth indicated by the navigational information, the display orientation may be maintained. Note that, as for the azimuth symbol 35, since the display position may be determined based on the spatial relationship in screen space, the display position may be changed. On the other hand, since the symbols other than the azimuth symbol 35 may be the navigational information associated with the geographical position, the display positions thereof may be maintained.

Since the second symbol indicative of the buoy symbol 41 may be a symbol of which the display orientation is determined, the display orientation may be changed. Moreover, since the buoy symbol 41 may be the navigational information associated with the geographical position, the display position may be maintained.

Since the symbol portion of the waypoint 44 is a circle and the shape has vertical symmetry, the display orientation may not be changed. Note that, if the symbol has other shapes (e.g., a triangle), the display orientation may be changed. As for the waypoint 44, since the name is displayed above the symbol and the distance is displayed below, the positions of these characters are interchanged in order to maintain the spatial relationship. Moreover, since they are characters, their display orientation may be changed so as to be readable.

Since the display positions of the device operation buttons indicative of the nautical chart direction change button 51, the menu buttons 52, or the screen direction change button 53 may be determined based on the spatial relationship in screen space, the display positions may be changed. Therefore, the display orientation of the screen may be changed so that the part where the screen direction change button 53 is operated may be located at the bottom of the screen. In addition, since these buttons may contain characters, the display orientation is changed so as to be readable. Note that even if these buttons contain icon(s), etc., instead of characters, the display orientation may also be changed so that the content(s) of the icon(s) are recognizable.

Further, as described above, there may be, for example, the North-up, the Heading-up, the Course-up, etc., as the modes to define the display orientation of the nautical chart. When the display orientation of the screen is changed by 180 degrees, the side which was the lower side of the screen before the change may be changed to become the upper side of the screen. Therefore, when maintaining these modes, the display orientation of the nautical chart. etc. may be changed. In order to prevent this, in this embodiment, when the display orientation of the screen is changed by 180 degrees in the North-up mode, so-called "North-down" may be set in which the nautical chart is displayed so that the lower side of the screen is oriented toward the north. Similarly in the Heading-up mode, "Heading-down" may be set in which the nautical chart is displayed so that the lower side of the screen is oriented toward the ship's heading direction. Further similarly in the Course-up mode, "Course-down" may be set in which the nautical chart is displayed so that the lower side of the screen is oriented toward the direction of the course of the navigational route. Thus, when the display orientation of the screen is changed, the mode which defines the display orientation of the nautical chart may be adjusted according to the changed angle. Alternatively, after the display orientation of the screen is changed, the mode may be selectable from "North-down," "Heading-down," and "Course-down" which are the modes after the adjustment. Alternatively, the mode may be selectable from the "North-up," "Heading-up," and "Course-up" which are the normal modes.

Moreover, during the operation of the display device 20 to change the settings, or during the operation of the display device 20 to register the information, the display orientation of the screen may be changed while maintaining the content of the operation by operating the screen direction change button 53. For example, during the creation of the navigational route, the display orientation of the screen may be changed, while maintaining the state (while maintaining the content of the navigational route creation).

Thus, for example, one user who is located at one side of the screen performs the selection of some transit locations, and in a state where the display device 20 is accepting the selection of the transit locations, even if the display orientation of the screen is changed, the display device 20 may continue this accepting state of the selection of the transit locations. Therefore, another user who is located at the other side of the screen may perform settings of remaining transit locations. Other than the transit locations, the same can be said for accepting the setting of the place of departure or the destination.

As described above, the display device 20 may include the acquisition part 21, the display part 22, the input part 24, and the arithmetic logical unit 26, and implement the method of displaying the navigational information by executing the navigational information display program to perform the following processing tasks. The acquisition part 21 may acquire the first navigational information associated with the geographical position. The display part 22 may display the navigational image expressed using the geometrical figure related to the first navigational information. Further, it may display at least one of the characters of the first navigational information characters indicative of the first navigational information, the second navigational information characters indicative of the second navigational information of which the display position is determined based on the spatial relationship in screen space, and the device operation characters related to the operation of this device (display device 20). The instruction signal which instructs the change in the display orientation of the screen may be inputted into the input part 24. The arithmetic logical unit 26 may change the display orientation of the characters while maintaining the display orientation of the navigational image, by the instruction signal being inputted into the input part 24.

Thus, since the display orientation of the characters may be changed according to the change in the display orientation of the screen, the user may be able to easily check the characters displayed on the display part 22. On the other hand, since the display orientation of the navigational image may be maintained, the user does not need to mentally rearrange the correspondence between the geographical position and the position on the screen. By the above configuration, the navigational image may be grasped smoothly even when the display orientation of the screen is changed.

Next, a second embodiment of the present disclosure is described with reference to FIGS. 6 and 7. Note that, in description of the second embodiment, like reference characters are assigned to like components in the figures, similar to the previous embodiment, to omit the description of the components.

In the second embodiment, a radar image is displayed as the navigational image instead of the nautical chart. The radar image may be displayed by the radar image display part 29 which has a similar configuration to the display part 22. The radar image display part 29 may be part of a radar device (an instrument on the main body side), or may be part of a multifunctional display device which acquires information from a plurality of ship instruments, such as the radar device, and displays the information.

Figure 6:
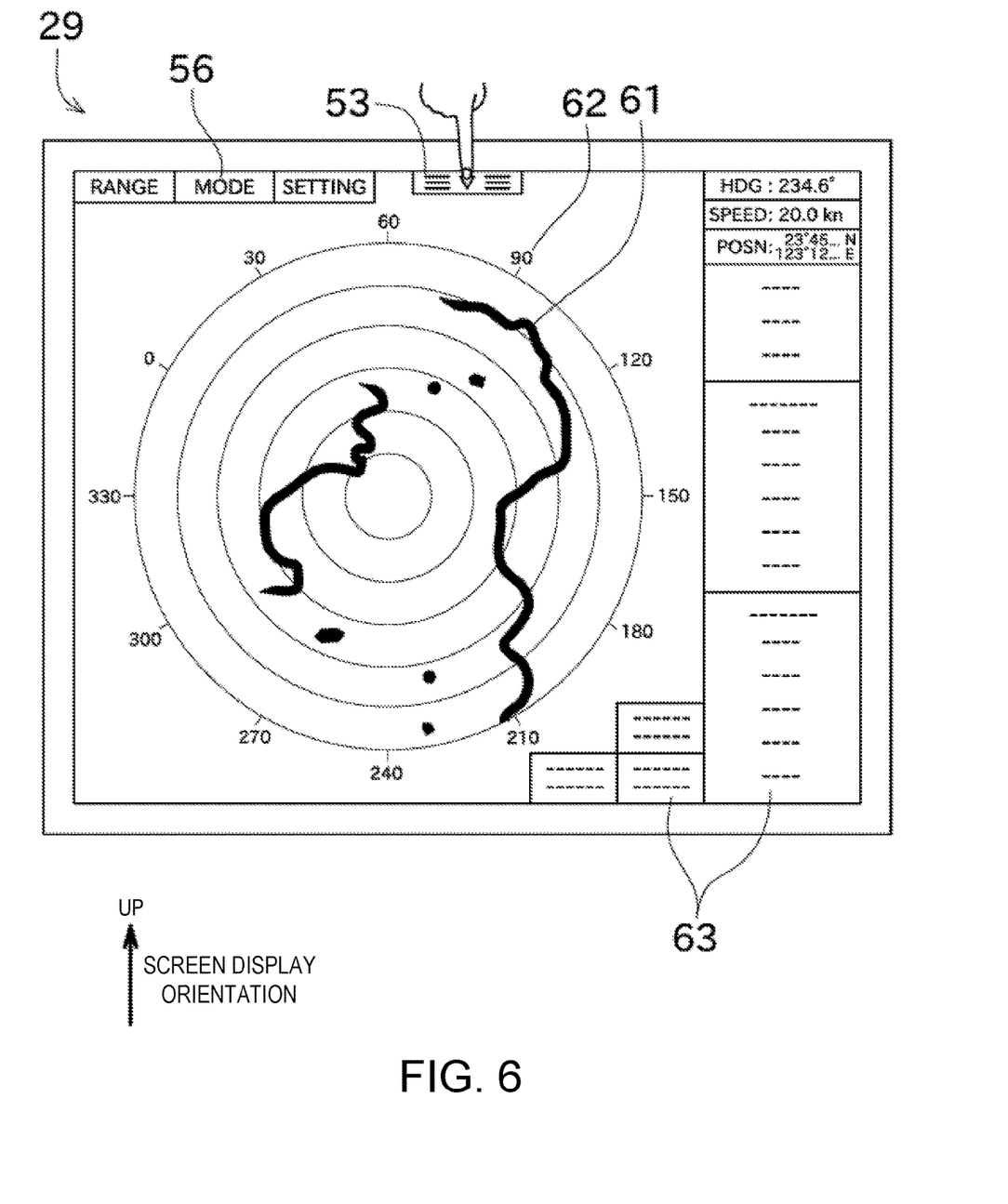
FIG. 6 is a view illustrating a screen which is displayed on a display part before changing a screen display orientation in a radar image display device according to a second embodiment of the present disclosure.

As illustrated in FIG. 6, radar echoes 61, azimuths 62, and radar information 63 may be displayed on the radar image display part 29 as the navigational information. The radar echoes 61 may correspond to the navigational image, the azimuths 62 may correspond to the first navigational information characters, and the radar information 63 may correspond to the second navigational information characters.

In addition to the screen direction change button 53, menu buttons 56 may be displayed on the radar image display part 29 as buttons for the device operations. The menu buttons 56 are buttons for performing operations related to the radar device, similar to the menu buttons 52.

Figure 7:
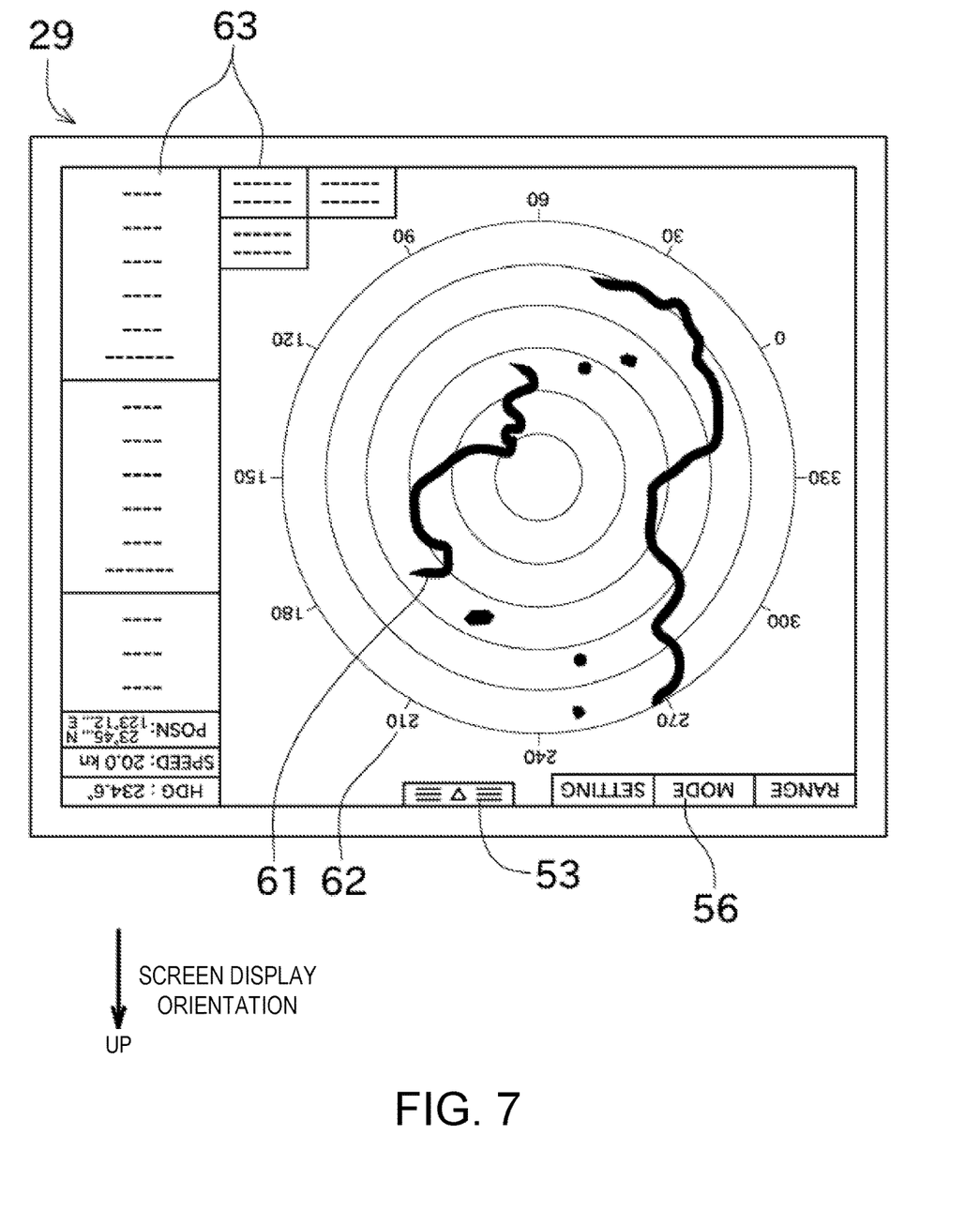
FIG. 7 is a view illustrating a screen which is displayed on the display part after the screen display orientation is changed in the radar image display device according to the second embodiment.

As illustrated in FIGS. 6 and 7, the display orientation of the screen is changed by 180 degrees by operating the screen direction change button 53. Since in the first embodiment the second navigational information and the device operation button may be displayed on the nautical chart so as to be superimposed and the nautical chart which is the navigational image may be displayed by the full screen, neither the display orientation of the nautical chart nor the display position of the nautical chart may be changed. However, in the second embodiment, since the radar echoes 61 which are the navigational images may not be displayed by the full screen, the display positions of the radar echoes 61 may be changed. Note that, although the display positions of the radar echoes 61 in the entire screen are changed (i.e., the radar echoes 61 are laterally shifted), the display positions of each radar echo 61 in the radar image (an area surrounded by a concentric circle in the figures) may not be changed. In order to prevent the display positions of the radar echoes 61 from being changed, the display positions of the radar echoes 61 may be maintained and the display position of the radar information 63 may be changed instead.

Although the embodiments of the present disclosure are described above, the above configurations may also be changed as follows.

Although in the above embodiments the display device 20 may be arranged so that the screen becomes parallel to the horizontal surface, it may be arranged at a different angle.

Part of the electronic nautical chart stored in the memory part 25 of the display device 20 may be in raster format. In this case, since some of the display items of the raster electronic nautical chart cannot be rotated, the rotation of the display orientation of the screen may be performed only when the vector electronic nautical chart is used.

Although the above embodiments may be the case where the display orientation of the screen is rotated by 180 degrees (i.e., upside down), the present disclosure may also be used for rotations at other angles (e.g., 90 degrees). In this case, a plurality of screen direction change buttons 53 may be displayed on the display part 22.

Although the screen direction change button 53 may always be displayed in the above embodiments, the screen direction change button 53 may be displayed once a given operation is performed.

Although the above embodiments may be the examples where the present disclosure is applied to the display device which mainly displays the electronic nautical chart and/or the radar image, the present disclosure may also be applicable to display devices which display other navigational information (e.g., weather information, underwater detection results) as long as it may display the navigational information associated with the position.

<Terminology>

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controlling module, microcontrolling module, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controlling module, or a computational engine within an appliance, to name a few.

Conditional language such as, among others, "can," "could," "might," or "may," unless specifically stated otherwise, are understood within the context as used in general to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow views described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted or executed out of order from that shown or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein are preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A nautical navigational information display device, comprising:
    a display configured to:
        display a nautical navigational image indicated using a geometrical figure related to first navigational information associated with a geographical position,
        display a second navigational information character indicative of second navigational information in which a display position of the second navigational information character is determined based on a spatial relationship defined in screen space of a screen displayed on the display, and
        further display a device operation character related to operation of the display device; and
    processing circuitry configured to:
        receive input of an instruction signal to instruct a change in a display orientation of the screen displayed on the display,
        change a display orientation of the device operation character while maintaining a display orientation of the nautical navigational image, when the input of the instruction signal is received,
        change the display position of the second navigational information character to a position corresponding to the display orientation of the screen after the change in the display orientation of the screen centering on the center of the screen, and
        change a display orientation of the second navigational information character in response to the input of the instruction signal, when the input of the instruction signal is received.

2. The navigational information display device of claim 1, wherein
    a first navigational information character indicative of the first navigational information is displayed on the display at a display position on the screen corresponding to the geographical position, and
    the processing circuitry changes a display orientation of the first navigational information character while maintaining the display position of the first navigational information character, in response to the input of the instruction signal.

3. The navigational information display device of claim 1, wherein
    a first symbol indicative of the first navigational information or second navigational information is displayed on the display, a display orientation of the first symbol changing according to an azimuth, and
    the processing circuitry maintains the display orientation of the first symbol when the instruction signal is inputted.

4. The navigational information display device of claim 1, wherein
    a second symbol indicative of the first navigational information or second navigational information is displayed on the display, a display orientation of the second symbol being predetermined, and
    the processing circuitry changes the display orientation of the second symbol in response to the input of the instruction signal.

5. The navigational information display device of claim 1, wherein
    a device operation button related to a device operation, a display position of the device operation button determined based on a spatial relationship defined in screen space of the screen, is displayed on the display, and
    the processing circuitry changes the display position of the device operation button to a position corresponding to the display orientation of the screen after the change, and further changes a display orientation of the device operation button, in response to the input of the instruction signal.

6. The navigational information display device of claim 1, wherein
    a screen direction change button to instruct the change in the display orientation of the screen is displayed on the display, and the instruction signal is inputted in response to an operation of the screen direction change button.

7. The navigational information display device of claim 6, wherein
    the screen of the display is rectangular, and the screen direction change button is displayed on at least one of four sides of the screen, and
    when the screen direction change button is operated and the instruction signal is inputted, the processing circuitry changes the display orientation of the screen so that a part where the screen direction change button is operated is oriented at a lower side of the four sides in the display orientation.

8. The navigational information display device of claim 1, wherein
    the processing circuitry changes the display orientation of the second navigational information in the screen through animation that passes through the center of the screen when changing the display orientation of the screen by 180 degrees.

9. The navigational information display device of claim 1, wherein
shapes of sea and land are displayed on the display as the nautical navigational image.

10. The navigational information display device of claim 9, wherein
the processing circuitry creates a navigational route by a place of departure, a transit location, and a destination being set, and in a state of accepting a selection of at least one of the place of departure, the transit location, and the destination of the navigational route, continues accepting the selection even when the display orientation of the screen is changed.

11. The navigational information display device of claim 1, wherein
the screen displayed on the display is arranged horizontally.

12. A method of displaying nautical navigational information, comprising:
acquiring first navigational information associated with a geographical position;
displaying on a display a nautical navigational image indicated using a geometrical figure related to the first navigational information;
displaying a second navigational information character indicative of second navigational information in which a display position of the second navigational information character is determined based on a spatial relationship;
further displaying a device operation character related to operation of a screen displayed on the display;
changing a display orientation of the device operation character while maintaining a display orientation of the nautical navigational image in response to an input of an instruction signal to instruct a change in a display orientation of the screen;
changing the display position of the second navigational information character to a position corresponding to the display orientation of the screen after the change in the display orientation of the screen centering on the center of the screen; and
changing a display orientation of the second navigational information character in response to the input of the instruction signal, when the input of the instruction signal is received.

* * * * *